June 14, 1960     R. E. DIENER     2,940,341

TURRET INDEXING MECHANISM

Filed April 14, 1958     5 Sheets-Sheet 1

INVENTOR.
ROBERT E. DIENER
BY Hudson, Boughton,
Williams, David Hoffmann
ATTORNEYS

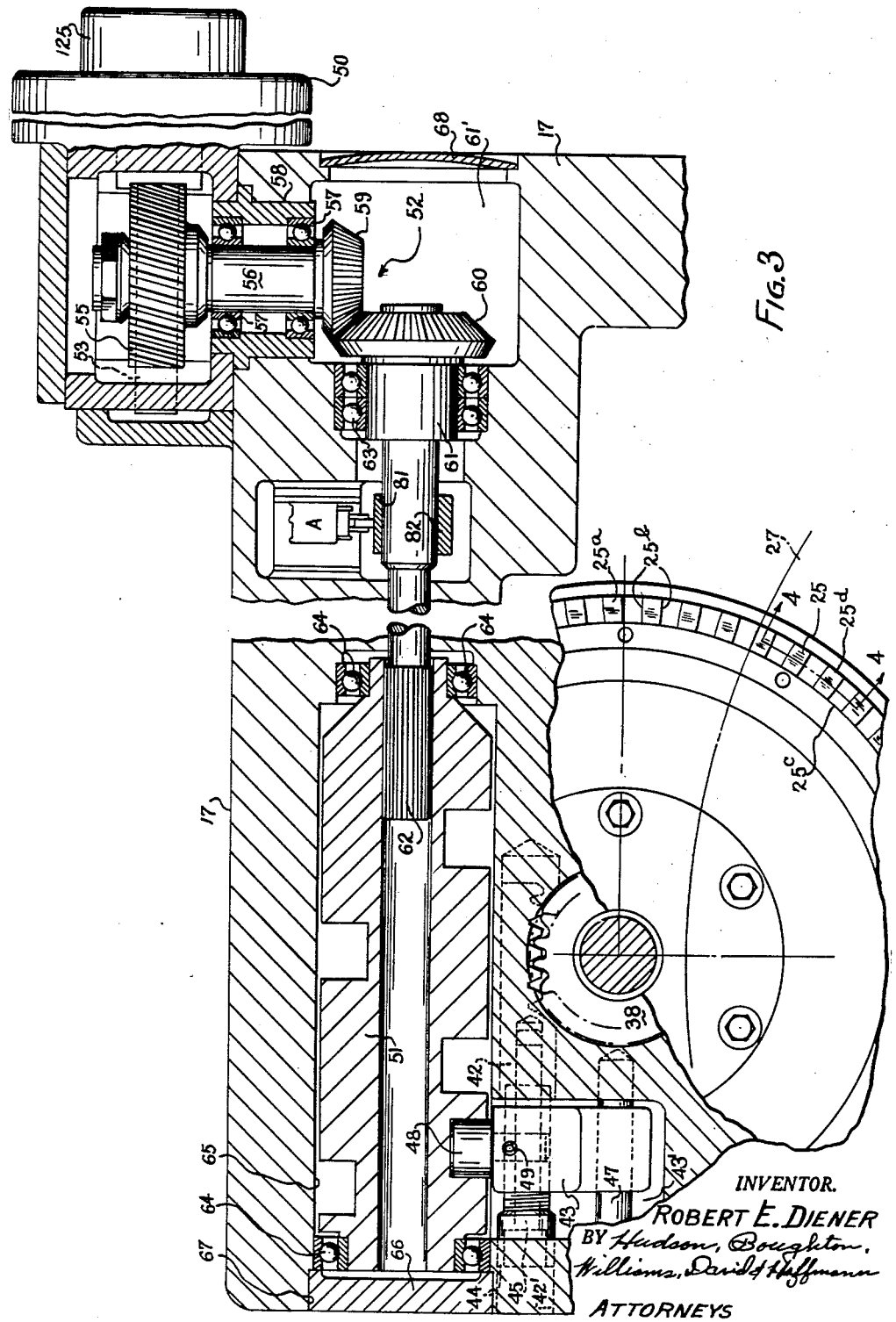

June 14, 1960
R. E. DIENER
2,940,341
TURRET INDEXING MECHANISM
Filed April 14, 1958
5 Sheets-Sheet 3
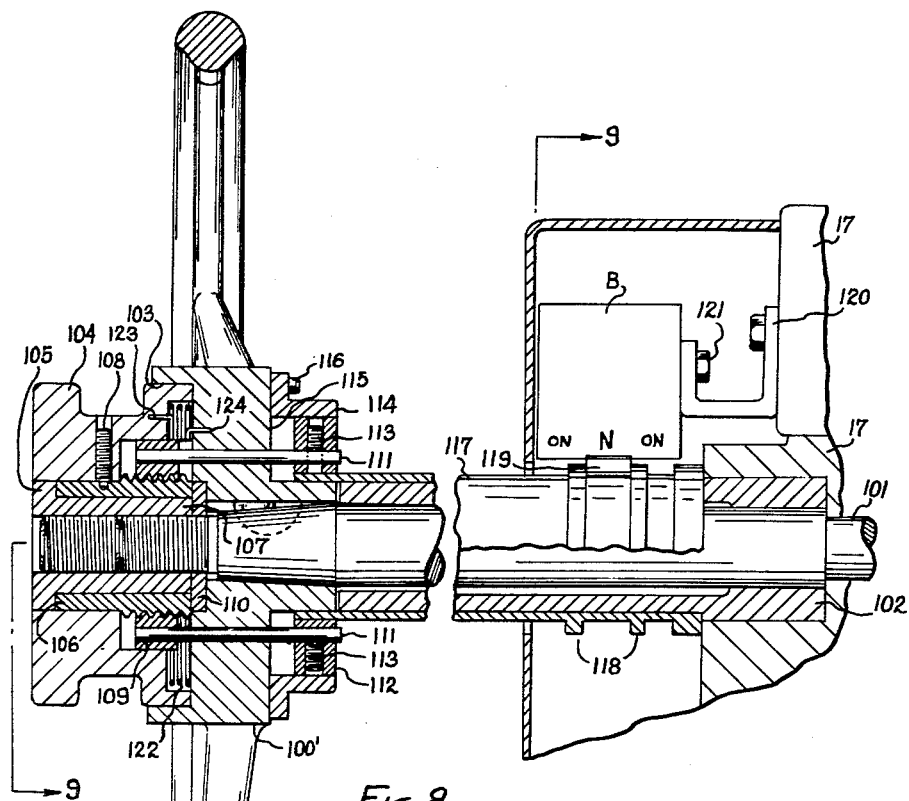
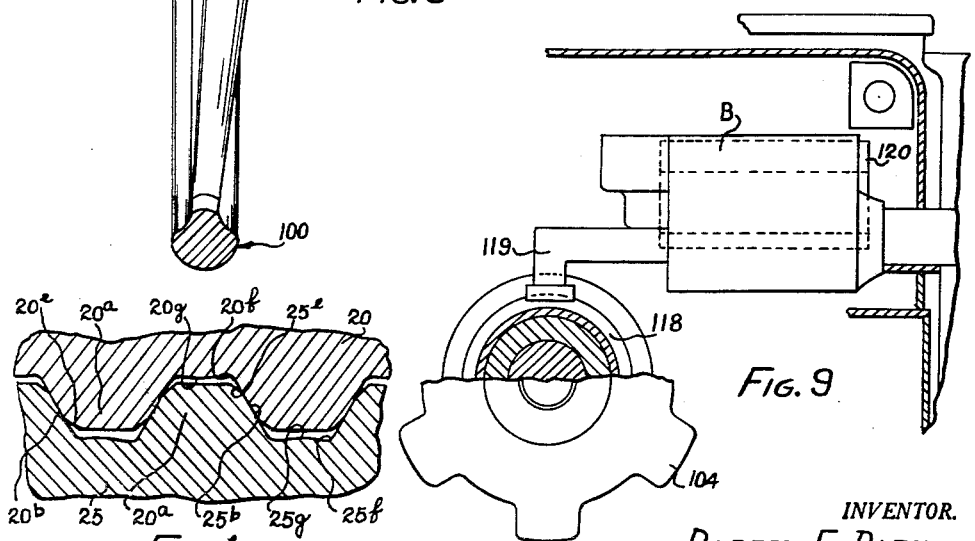
INVENTOR.
ROBERT E. DIENER
BY
ATTORNEYS June 14, 1960 R. E. DIENER 2,940,341
TURRET INDEXING MECHANISM
Filed April 14, 1958 5 Sheets-Sheet 5

INVENTOR.
ROBERT E. DIENER
BY Hudson, Boughton,
Williams, David & Hoffmann
ATTORNEYS

United States Patent Office 2,940,341
Patented June 14, 1960

2,940,341

TURRET INDEXING MECHANISM

Robert E. Diener, Cleveland, Ohio, assignor to The Warner & Swasey Company, Cleveland, Ohio, a corporation of Ohio Filed Apr. 14, 1958, Ser. No. 728,422

7 Claims. (Cl. 74—824)

The present invention relates to mechanism for indexing and locating and locking in indexed position the indexible turret of a machine tool as, for example, the indexible turret of the turret slide of a turret lathe.

It is important that the mechanism for indexing an indexible turret of a machine tool be capable of indexing the turret one or more indexed stations in either direction under the control of the operator. Also it is important that the turret be accurately located and locked in indexed position.

The present invention contemplates an indexing mechanism for an indexible turret of a machine tool wherein the operator can initiate the indexing movement of the turret in either direction and without further attention from the operator the indexing movement of the turret automatically will stop after the turret has been indexed one station and the turret will be accurately located and locked in its indexed position at the new station.

The invention also contemplates an indexing mechanism such that the operator can cause the turret to so index in either direction through a plurality of successive indexing stations.

The invention includes the provision of an indexing mechanism for the indexible turret of a machine tool wherein the indexing movement of the turret is effected by a power operated rotatable indexing cam with said cam also controlling the unlocking and the locking and locating of the turret in indexed position relative to the slide or member which carries the turret.

According to the invention the turret is provided with a series of spaced cam followers corresponding in number to the faces of the turret and arranged in a circle coaxial with the indexing axis of the turret and cooperating with the rotatable indexing cam to produce the indexing movements of the turret in opposite directions.

Although only one of the cam followers need be engaged with the rotatable indexing cam during any indexing movement it is preferable that a plurality of such cam followers be engaged with the cam during each indexing movement of the turret so as to distribute the load and forces.

The invention also includes providing the slide or member which carries the turret with an upwardly facing annular toothed coupling element and the turret with a downwardly facing similar coupling element, with the teeth of said elements interengaging and functioning to accurately locate and lock the turret in each indexed position.

The rotatable indexing cam is provided with a cam groove that effects a raising of the turret to disengage the teeth of said coupling elements and unlock the turret for indexing movement and for lowering the turret to interengage the teeth of said elements and accurately locate and lock the turret in indexed position. The teeth of the toothed elements are provided with contours such that the turret will always be accurately located and locked in position for each indexed station.

The rotating indexing cam preferably is driven by a reversible electric motor, the circuit to which is interrupted upon the completion of each indexing step in the indexing movement of the turret by a switch actuated by a cam rotatable with the indexing cam. Also the circuit to the motor is controlled manually by the operator for forward or reverse indexing movement by a control arrangement such that the operator can cause the turret to be indexed one step or station or can cause the turret to index through a desired number of successive steps or stations.

The indexing mechanism of the invention also includes a brake acting on the driving connection between the motor and the rotatable indexing cam whenever the motor is energized, said brake being released automatically upon energization of the motor.

The invention further resides in certain novel features of construction, and combinations and arrangements of parts, and further objects and advantages thereof will be apparent to those skilled in the art to which it pertains from the following description of the present preferred embodiment thereof described with reference to the accompanying drawings in which similar reference characters represent corresponding parts throughout the several views, and in which:

Fig. 3 is a fragmentary sectional view approximately along line 3—3 of Fig. 2 for showing a brake and motor with a section through an indexing control cam drive;

Fig. 4 is an enlarged sectional view along line 4—4 in Fig. 3 but with the toothed portions of the turret and saddle coupling in meshing engagement as illustrated in Fig. 2;

Fig. 8 is a vertical sectional view of the turret handwheel along section line 8—8 of Fig. 1;

Fig. 9 is a fragmentary elevational end view of a handwheel along section line 9—9 in Fig. 8, wherein parts have been broken away to better illustrate the preferred embodiment of the present invention.

Before explaining in detail a preferred embodiment of the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the claims herein beyond the requirements of the prior art.

Figure 1:
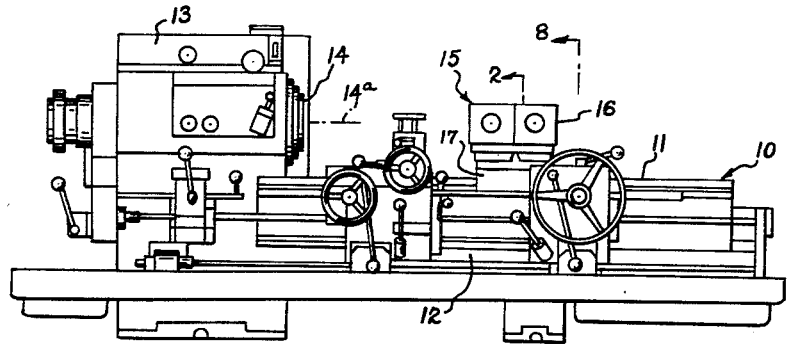
Fig. 1 is a front elevational view of a machine tool having a rotatable turret thereupon embodying a preferred construction of the present invention.

Referring now to the drawings and particularly to Fig. 1 of the drawings, a machine tool is indicated generally by the reference numeral 10, the tool 10 being of the turret lathe type having on its bed 12 a pair of conventional ways 11. A head portion 13 is shown at one end of the bed 12 housing a rotatable spindle 14.

The machine tool 10 has an indexible, and more particularly a hexagonal, turret 16 mounted upon a slide 17 movably guided on the ways 11 by grooves 18. The bottom side of turret 16 has an annular groove 19 concentrically formed about the central axis thereof for receiving a toothed or serrated coupling member 20 and a dust cover ring 21 which is rigidly secured between the member 20 and the wall of groove 19. If desired, the dust cover 21 can be integrally connected to member 20. A multiplicity of socket-head screws 22 and lock washers 22' and locating pins, not shown, are provided for securing coupling member 20 to the bottom side of hexagonal turret 16 and in the groove 19. The slide 17 has an annular recessed shoulder 24 formed in the upper side thereof coaxial with the central axis of the turret 16 for receiving a toothed or serrated coupling member 25, which mates with and is complementary to the toothed member 20. Toothed coupling member 25 is secured to the slide 17 by a plurality of appropriate means such as screws, not shown, and locating pins 26.

Although the coupling members 20 and 25 which are substantially identical can be serrated they are preferably toothed and, more particularly, are of a special configuration as best shown in Figs. 3 and 4.

Referring to Fig. 3 the teeth 25a of member 25 shown in plan view have curved radial sides 25b and are substantially convex. The curved radial sides 20b, 25b, of the teeth 20a, 25a, respectively, are ground by a cutter or grinding wheel which travels a path described by an arcuate line 27 in Fig. 3. Moreover, inner peripheral faces 20c, 25c, and outer peripheral faces 20d, 25d, of the teeth 20a, 25a, respectively, are truly concentric with the central axis of the coupling members 20 and 25. This results in teeth with precision spacing and which teeth are concentric to the central axis of the coupling members 20 and 25.

Referring to Fig. 4, the coupling teeth 20a, 25a, are shown in meshing engagement. The cross section of each tooth as shown in Fig. 3, is substantially the shape of a frustrum of an isosceles triangle, but with a small chamfer at the top of each tooth on either side thereof, the chamfers 20e, 25e, serving to break the sharp corner which might otherwise result during a stress concentration in the mating of the teeth 20a, 25a under load. The chamfers 20e, 25e, also permit larger fillet radii 20f, 25f, at the root of the teeth 20a, 25a. At the root of two adjoining teeth on each of the members 20, 25, the respective fillet radii 20f, 25f, terminate at a central portion between each two teeth in a small rise 20g, 25g, in the surface thereof. The rise may be referred to as a gable and provides the teeth roots with a gable bottom which eliminates any possibility of a step being formed in the root of the teeth which might cause stress concentrations.

The radially curved sides 20b, 25b, of each of the teeth 20a, 20b, permit a varying degree of localization of teeth contact area. However, for normal requirements the bearing contact area is centrally located and the minimum length of contact is approximately 75% of the face width of each tooth. The depth of the contact pattern or bearing surface is substantially equal to the depth of each tooth.

The foregoing disengageable coupling comprised of coupling members 20 and 25 serves to precisely align the turret 16 axially and circumferentially. Moreover, the coupling also provides an accurate, light, compact and self-contained connection in which the teeth 20a, 25a, both center and drive, as compared to other forms of releasable couplings where the teeth drive only and other means for centering, such as journal bearings, are necessary.

An important feature of the self-centering coupling is that the relative angular position of the rotatable turret 16 at the end of an indexing movement need not be precise but need only be within a predetermined angular dimention or tolerance since the teeth 20a on the bottom side of the turret 16 will be guided into bearing contact and meshing engagement between the upstanding teeth 25a in the coupling member 25 mounted upon the saddle 17. In this manner the precise mating engagement and the accurate relative disposition of the coupling members 20, 25, are not only always maintained but the tool carried by the turret will always be accurately located relative to a workpiece carried by the spindle 14 of the machine 10. Due to the self-centering characteristic of the coupling the central vertical axis of the turret 16 will be maintained coincidental with a vertical plane passing through the spindle axis 14a so as to prevent any eccentricity in the machining of a rotating workpiece.

A plug member 28, having an axially extending portion 29 is mounted within a central stepped recess 30 in turret member 16. Plug 28 is rigidly secured to the turret 16 by means of appropriate fastening means such as screws 31 and lockwashers 31'. The slide 17 is provided with an internally threaded nut 32 seated within a recess 33 machined in slide 17, which recess 33 is of a stepped configuration and coaxially and concentrically disposed with turret 16. Machine screws 35 and lock washers 35' are used as fastening means for securing the nut 32 to the upper face portion of slide member 17. A sleeve 36 having external threads 36' machined thereon is threaded into the nut 32. Moreover, the sleeve 36 is provided with an axial bore 37 extending the entire length thereof for receiving the axially extending portion 29 of plug 28. Sleeve 36 at the lower end thereof has a gear section 38 for a purpose to be hereinafter described.

A pair of axially-spaced needle bearings 39 are interposed between the axially extending portion 29 of plug member 28 and the threaded sleeve 36 so as to provide free rotation of the plug member 28 relative thereto. Plug member 28 has a radial shoulder portion 40 in juxtaposition with the upper end of threaded sleeve 36. Additional needle bearings 41 of the flat radial type have been interposed between radial shoulder 40 and the upper end of sleeve 36 so that the turret 16 and the plug member 28 rigidly secured thereto are frictionlessly journalled upon and within threaded sleeve 36.

Figure 2:
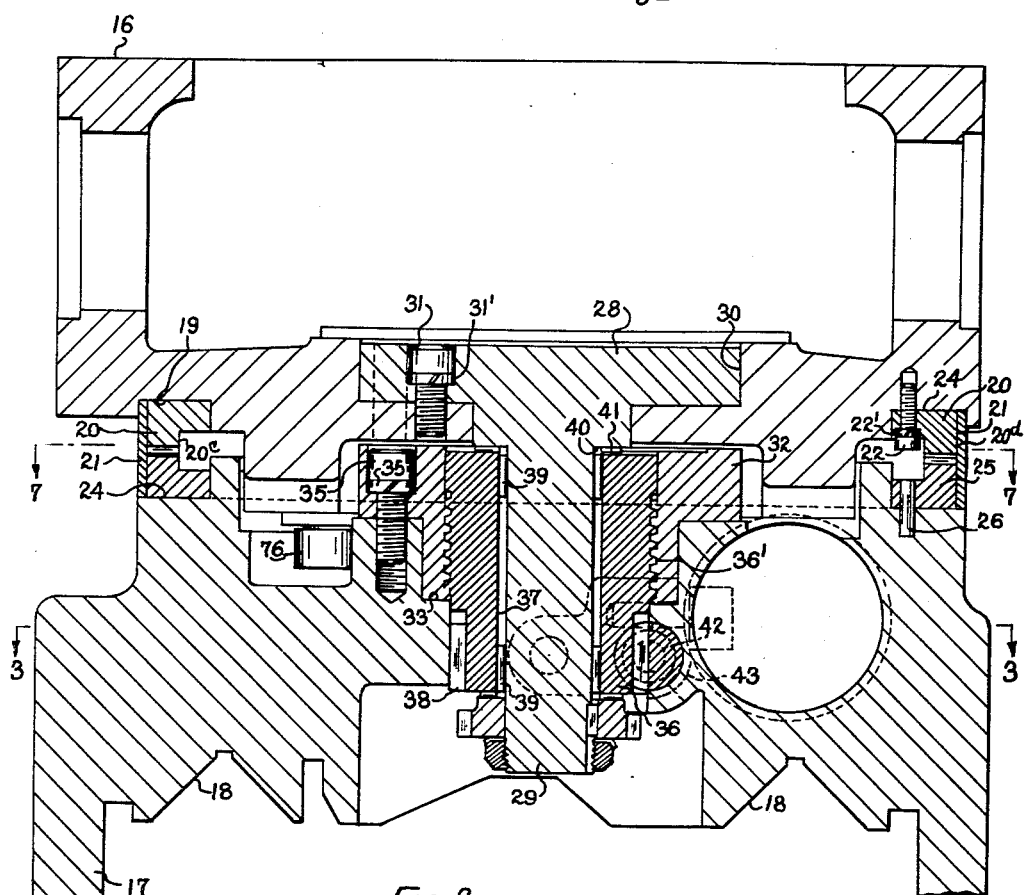
Fig. 2 is a vertical sectional view of the machine tool base, turret, and part of the indexing mechanism therefor with the turret indexed to a position different from that indicated in Fig. 1 so as to show a sectional view of two tool ports.

Referring now to Figs. 2 and 3, the gear section 38 is in meshing engagement with a toothed rack bar 42 movably accommodated within drill hole or bore 42' in slide 17. Rack 42 is rigidly secured to a carrier member 43 in a recess 43' formed in the slide 17 by the following arrangement. An externally threaded sleeve bolt 44 is threadedly secured in the carrier member 43 in such a manner that the bolt ends extend from either side of carrier 43. A bolt or screw 45 is threaded through sleeve bolt 44 and into rack 42 for drawing the two latter members into solid axial abutment with each other and form a rigid assembly of rack 42, sleeve bolt 44 and screw 45 with carrier 43. A guide pin 47, firmly secured in slide 17 transversely of recess 43' and parallel to sleeve bolt 44 and rack 42, slidably supports carrier 43 for a purpose to be described. A locking cam follower 48 is threaded into carrier 43 in a direction perpendicular to the longitudinal axis of guide pin 47 and rack 42. A set screw 49 serves to maintain follower 48 in assembly with carrier 43.

The mechanism for actuating rack 42 to rotate sleeve 36 up and down in nut 32 and unlock and lock turret 16 by disengaging and engaging toothed couplings 20 and 25, respectively, will now be described.

Figure 10:
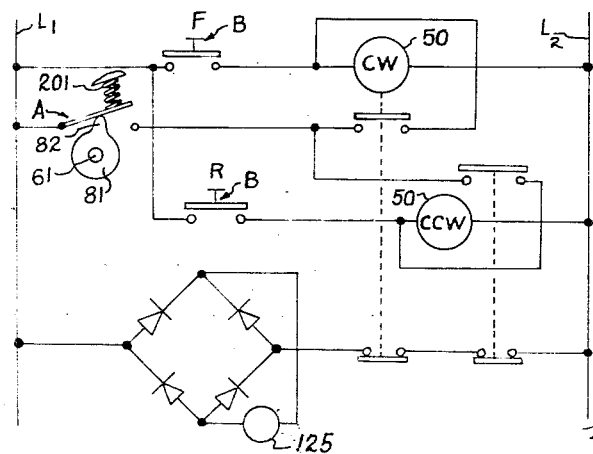
Fig. 10 is a schematic electrical layout of the automatic indexing turret control circuit.

A driving means comprising a reversible electrical motor 50, Figs. 3 and 10 is provided for rotating an indexing control cam 51 via a reduction gear mechanism 52 interposed therebetween. Motor 50 is provided with a drive shaft 53 having a worm gear, not shown, rigidly secured thereto. The shaft 53 is rotatably journalled in the frame of the slide 17. A worm wheel 55, in mesh with the motor driven worm gear, is rigidly secured to a shaft 56 journalled by bearings 57 in the frame of slide 17 and located within a bushing 58. A beveled gear 59 rigidly secured to the shaft 56 meshes with a similarly beveled gear 60, rigidly secured to a shaft 61 having a splined portion 62 at one end thereof.

Anti-friction ball bearings 63, serve to journal shaft 61 within a transverse opening 61' formed in slide member 17. The indexing control cam 51 is connected to the splined end 62 of shaft 61. Ball bearings 64 are provided on both ends of cam 51 for the rotatable mounting of the control cam 51 within a suitable cylindrical bore 65 aligned with opening 61'. A plug closure member 66 is threaded within an enlarged outer end 67 of cylindrical bore 65. Likewise, a disk 68 closes the outer end of opening 61.

Figure 6:
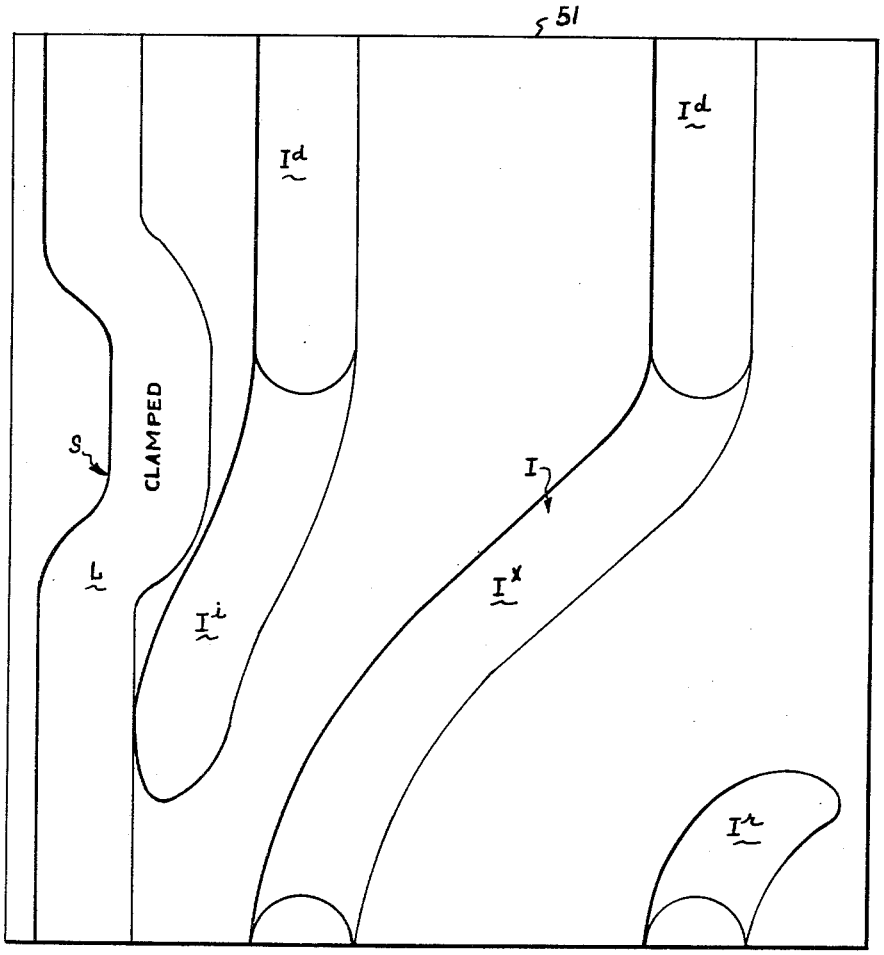
Fig. 6 is a layout of the indexing control cam showing how the cam surfaces are generated in two dimensions.
Figure 5:
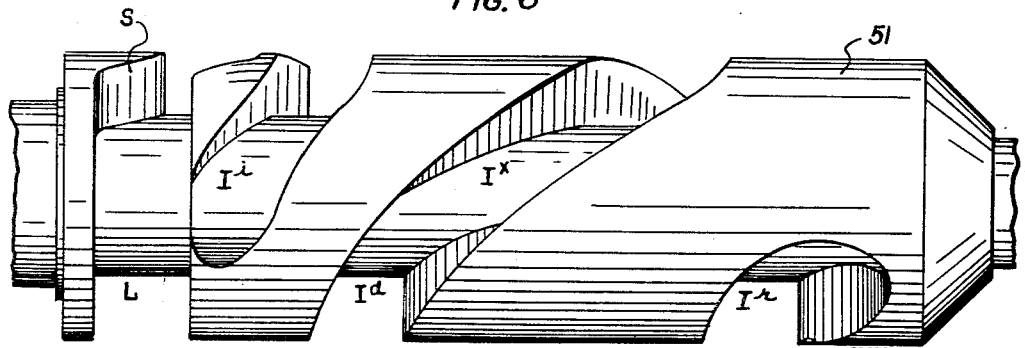
Fig. 5 is an enlarged view of the indexing control cam.

Rack member 42 is interposed in bore 42' of slide member 17, the bore 42' having an axis parallel to the axis of the bore 65. Locking cam follower 48 extends from carrier 43 into bore 65, substantially perpendicular to the longitudinal axis thereof. Referring to Figs. 5 and 6, the cam 51 comprises a pair of separate cam surfaces L and I in side-by-side relationship. Cam surface or groove L is of a closed circuit type having a circular dwell path portion for maintaining the turret 16 in unlocked and unclamped relation to slide 17 by disengagement of toothed coupling members 20 and 25. A clamping or locking portion S, interposed in the path of circular groove L, upon rotation of cam 51 moves or forces the locking cam follower 48 axially to the right for locking or clamping the turret 16 to slide 17 via rack 42 and gear 38 to engage coupling members 20 and 25 in a manner described hereinabove.

Cam 51 is also provided with an indexing cam surface or groove of an open circuit type comprised of a run-in portion $I_i$, a dwell portion $I_d$, an indexing portion $I_x$, another dwell portion $I_d$, and a runout portion $I_r$.

Figure 7:
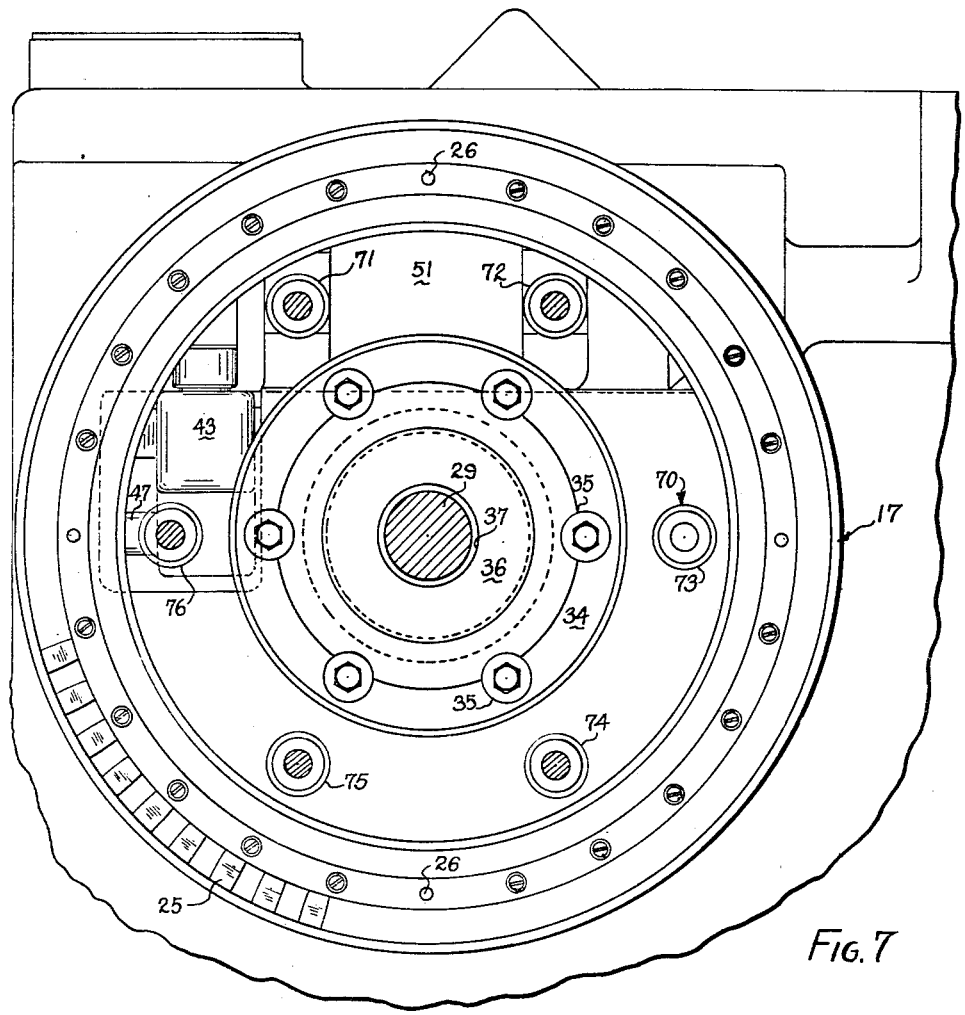
Fig. 7 is a top plan view of the automatic indexing turret with the turret head removed, as viewed along line 7—7 of Fig. 2.

Referring to Fig. 7, the rotation or indexing of turret 16 is accomplished by transferring the driven motion of control cam 51 through indexing cam followers 70 provided on the underface of turret 16. The cam followers 70 consist of six equiangularly-spaced indexing cam followers 71, 72, 73, 74, 75 and 76. Cam followers 70 are each provided with a roller portion which is received in the indexing groove I of cam 51 with cam followers 70 being secured to turret 16 by means of threaded shanks integral therewith.

The turret 21 is indexed in the following manner.

Reversible motor 50 drives rotatable control cam 51 by means of a reduction gear mechanism 52 which has been described in detail hereinabove. There is a cam follower 70 for each of the turret faces which in the illustrated form are six in number. In the instant example, two cam followers, 71 and 72, are shown received in driving relationship in indexing cam surface or groove I of cam 51. However, it is to be understood that more than or less than two cam followers can be adapted to be in driven engagement with cam follower 51 at any given moment. In many instances it may be impossible to provide a single cam follower which will carry all the necessary load for indexing turret 16 and the necessity may exist for two or more cam followers being simultaneously in driven relationship with cam 51. In the present illustrated embodiment, at least two of the cam followers 70 are always engaged with cam 51.

Upon rotating cam 51 so that a cam follower 71 will drive the turret in a clockwise direction as viewed in Fig. 7, cam follower 72 will be forced out of cam groove I via cam groove runout portion $I_r$. As turret 16 is rotated in a clockwise direction, cam 76 will be caused to move toward indexing groove I and into the run-in portion $I_i$. During the next indexing of turret 16 it follows that cam follower 75 will be brought into engaging relationship with cam 51, as cam follower 71 is run out of the cam groove I. Consequently, from the above description it is apparent that two cam followers will at all times be within the indexing groove I and that, as the turret is indexed from one position to the next, an additional cam follower will be brought into contact with cam 51 and one of the cam followers 70 will be driven out of contact with cam 51.

Moreover, due to the fact that the motor 50 is reversed by reversing the polarity thereof in a conventional manner, the turret 16 can be indexed in a counterclockwise direction, as well as in the aforedescribed clockwise direction. Thus, the run-out portion $I_r$ of cam 51 can serve as a run-in portion and, accordingly, the run-in portion $I_i$ can serve as a run-out portion.

It is further to be understood that the cam grooves L and I need not be provided on the same rotatable drum, but can be made in separate drums having separate drive arrangements if desired.

Another novel feature of the present invention resides in the use of a normally closed limit switch A, Fig. 3, secured within slide 17 in juxtaposition with shaft 61, disposed in opening 61'. A cam 81 having a single high point or lobe 82 thereon is rigidly secured to an intermediate portion of shaft 61 adjacent the switch A. A conventional outwardly spring-biased roller forms a part of switch A and rolls upon the surface of cam 81. Thus, upon a single revolution of shaft 61 and a corresponding single revolution of indexing control cam 51, the switch A will be momentarily actuated open and the motor 50 will be stopped upon release of the motor switch control by the operator. As will be more clearly hereinafter pointed out, switch A is connected to a stop and brake mechanism for de-energizing and braking motor 50 by an electrical circuit which will be described hereinafter. By the provision of switch A, the motor is prevented from indexing the turret 16 more than one station in either direction after the operator has released the motor switch control. However, the turret 16 will continue to be indexed from one station to the next so long as the operator continues to actuate the motor control switch.

Referring now to Figs. 8 and 9 of the drawings, a control mechanism, for energizing the motor 50 and causing the indexing of turret 16 one station in either of two directions, is coaxially mounted in a handwheel 100 keyed to a driven shaft 101 rotatably mounted in shaft sleeve 102 and slide 17. Upon rotating handwheel 100, and accordingly rotating shaft 101, the slide 17 resting upon the horizontal slideways 11, is caused to be moved therealong.

The control mechanism for controlling motor 50 is built into the handwheel 100 in the following manner.

A central hub 100' of handwheel 100 has a counterbore 103 therein for receiving an annular flange portion of a turning handle 104 therein. The handle 104 has a central cylindrical bore for receiving an internally threaded bushing 105 loosely therein. An externally threaded sleeve 106 is loosely fitted over a reduced end portion 107 of internally threaded bushing 105 and rigidly secured to turning handle 104 by means of a set screw 108. An internally threaded nut 109 is threaded upon externally threaded sleeve 106. The turning handle 104 is counterbored to accommodate sleeve 106 and nut 109 therein. Disposed between the inner axial ends of sleeve 106 and bushing 105 and the opposite face of the hub of wheel 100 is a flat bearing washer 110. Washer 110 is disposed at the threaded end of shaft 101, which is rotatably secured within shaft sleeve 102, tightly secured in a portion of slide member 17.

Nut 109 is nonrotatably secured relative to the hub 100' by means of pins 111. Pins 111 are parallel to the axis of shaft 101 and slidably mounted within corresponding portions of the hub of handwheel 100. The outer ends of guide bars 111 are tightly secured to nut 109 and the other ends of the guide bars are rigidly secured to an annulus or ring member 112 by means of set screws 113 threaded therein. The ring member 112 is slidably disposed within an axial bore of a flanged annulus 114, which is connected to an adjoining hub face 115 of the handwheel 100 by means of screws 116. Thus, upon the rotation of handle 104, nut 109 is moved axially upon externally threaded sleeve 106, and since the guide bars 111 are rigidly connected to ring member 112, the latter slides within the internal cylindrical opening of flanged annulus 114. Rigidly secured to internally cylindrical ring member 112 is a tubular cam sleeve 117, which extends from the ring 112 axially towards slide 17. Tubular cane sleeve 117 loosely slides over the external periphery of shaft sleeve 102, which as hereinbefore pointed out, is rigidly connected to slide member 17.

Tubular cam sleeve 117 is provided with a pair of radial flanges 118 in axially spaced-apart relationship for receiving therebetween a switch lever 119. As best shown in Fig. 9, switch lever 119 is operatively connected to a normally open switch B. Upon moving the switch lever 119 in either of two directions, the switch B can be actuated to "on" position. A neutral "N" position between the two "on" positions is provided for turning the switch off.

As shown in Fig. 8, the switch lever 119 has been moved to the right into an "on" position for energizing the reversible motor 50 in a predetermined direction. Should the sleeve 117 be moved in an axial direction to the left, as seen in Fig. 8, the reversible motor 50 would be energized in a reverse direction, whereupon the turret 16 would be indexed in a counterclockwise direction. Switch B is connected to slide member 17 in a conventional manner. For example, a U-shaped bracket member 120 connects switch member B to slide member 17 by the use of screws 121.

Turning handle 104, upon being rotated in a clockwise or counterclockwise direction from a neutral position, actuates the electric motor 50 in a direction to index the turret 16 clockwise or counterclockwise, respectively. A self-centering coil, or "rat-trap" spring 122 has a tang 123 immovably secured to a portion of handle 104, and another tang 124 rigidly secured in the hub member 100' of turning wheel 100. The "rat-trap" spring 122 performs the function of returning the turning handle 104 and cam sleeve 117 to a central neutral position whereby the switch lever 119 is automatically returned to the "off" or neutral position "N."

An electrically controlled brake mechanism 125, Fig. 3, is coaxially disposed upon the motor shaft of motor 50. The brake performs the important function of immediately stopping the rotating drive shaft 53 of motor 50 upon opening switch A. It should be noted that the brake B can be of an electromagnetic type or a conventional brake which is electrically controlled.

The general operation of the new and novel indexing mechanism of the present invention which has been described hereinabove is summarized by the following description of the schematic electrical diagram of Fig. 10. More particularly, Fig. 10 is provided to schematically illustrate the control circuit of the present invention.

A pair of main lines $L_1$ and $L_2$ is provided with a switch B having forward and reverse motor control contacts F and R, respectively, for energizing the motor 50 in a clockwise and counterclockwise direction, respectively, and thereby indexing the turret 16 one station in a forward or reverse direction.

For example, should the motor control forward contact switch F be closed, the brake 125 would immediately be de-energized or released by opening normally closed brake control contact of relay CW. Alternatively, should the motor control switch reverse contact R be closed, the brake 125 would immediately or instantaneously be de-energized or released by opening normally closed brake control contact of relay CCW. Brake B is connected in parallel with a bridge connected across the lines $L_1$ and $L_2$. Motor 50, via gear drive 52, rotates cam 81 having lobe 82, shown in Fig. 8, for permitting open switch A to be biased closed by a spring 201 until the cam 81 has completed one revolution and the turret has been indexed one station, at which time, switch A is opened and retained in open position by lobe 82 until either switch contact F or switch contact R of switch B is closed. As hereinbefore pointed out, contacts F and R are automatically opened by "rat-trap" spring 122 when the operator releases handle 104.

Upon opening switch A by cam 81, the brake 125 is again energized for immediately bringing the drive shaft of motor 50 to a stop with the turret locked in the selected position.

The operation is repeated for indexing the turret 16 more than one station. Under no circumstances will the turret 16 be actuated more than one station by continually holding the forward or reverse switch B closed without the operation of the motor being automatically interrupted by the opening of switch A. However, after momentarily opening switch A, the switch A is automatically closed again so that the circuit is complete for the next indexing operation.

While I have shown and described a specific embodiment in accordance with my invention, it is understood that the same is susceptible of many changes and modifications, as known to a person skilled in the art, and I intend to cover all such changes and modifications within the scope of the appended claims.

Having thus described my invention, what I claim is:

1. A mechanism for rotatably indexing an indexible turret carried by a slide of a machine tool and comprising a plurality of cam follower means arranged on the underside of said turret in a circularly spaced series concentric to the indexing axis of the turret, a power driven rotatable indexing cam drum carried by said slide and provided with separate cam grooves one of which is an indexing cam groove and another of which is a turret locking and clamping cam groove, said cam follower means being adapted to successively engage in said indexing cam groove, interengageable annular toothed locating and locking elements concentric to the indexible axis of the turret and carried respectively by the underside of said turret and the upper side of said slide, means for raising and lowering the turret axially to disengage or interengage said elements, and means carried by said slide and operatively associated with said locking and unlocking cam groove and actuated by said cam drum prior to and at the conclusion of each step of indexing movement imparted to said turret to actuate said means for raising and lowering the turret axially to disengage or interengage said elements.

2. An indexing mechanism as defined in claim 1 wherein said indexing cam groove and said locking and unlocking cam groove are axially spaced on said cam drum while said locking and unlocking cam groove is of the closed circuit type and has a circular dwell path portion for maintaining the turret in unlocked and unclamped relation by disengagement of the teeth of said elements and a clamping or locking path portion which causes engagement of the teeth of said elements.

3. An indexing mechanism as defined in claim 2 wherein the power drive for the indexing cam drum includes means for reversing the direction of rotation of said drum and under the control of the operator whereby the turret can be selectively indexed in either direction.

4. An indexing mechanism as defined in claim 3 wherein control mechanism is provided for the power drive to said rotatable cam drum which includes means enabling the operator to effect a single station to station indexing increment of the turret or to effect automatically a plurality of successive station to station indexing increments thereof.

5. An indexing mechanism as defined in claim 4 wherein the drive to the rotatable cam drum includes a reversible electric motor actuating a drive train.

6. An indexing mechanism as defined in claim 5 wherein there is provided brake means effective on said drive train and control means for said brake means operative to automatically apply said brake means upon deenergization of said electric motor and to release said brake means upon energization thereof.

7. An indexing mechanism as defined in claim 6 wherein said control mechanism includes a switch controlled by the rotation of the cam drum and automatically opened upon the completion of each full revolution of the cam drum to deenergize said motor, said control mechanism also including means for initiating forward or reverse energization of the motor, and means under the control of the operator to effect a single complete revolution of the cam drum or a continuous series of complete revolutions thereof during which said switch is ineffectual to deenergize the motor until the completion of the final revolution of the cam drum in the series of revolutions.

References Cited in the file of this patent

UNITED STATES PATENTS

| | | |
|---|---|---|
| 2,202,117 | Muller | May 28, 1940 |
| 2,334,544 | Curtis | Nov. 16, 1943 |
| 2,621,396 | Gracchi | Dec. 16, 1952 |
| 2,852,960 | Brems | Sept. 23, 1958 |
| 2,874,595 | Foster | Feb. 24, 1959 |

OTHER REFERENCES

Standard Tool & Manufacturing Co. Bulletin, effective date Mar. 12, 1953. (Copy in Div. 12.)